United States Patent
Pannek

(10) Patent No.: US 8,280,604 B2
(45) Date of Patent: Oct. 2, 2012

(54) METHOD AND DEVICE FOR DETECTING ACCELERATION PEAKS IN TIRES

(75) Inventor: Thorsten Pannek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 484 days.

(21) Appl. No.: 12/542,388

(22) Filed: Aug. 17, 2009

(65) Prior Publication Data

US 2010/0057295 A1 Mar. 4, 2010

(30) Foreign Application Priority Data

Aug. 27, 2008 (DE) .......................... 10 2008 041 608

(51) Int. Cl.
*G06F 7/70* (2006.01)
(52) U.S. Cl. ........................................... 701/70; 701/79
(58) Field of Classification Search ..................... 701/70, 701/79
See application file for complete search history.

(56) References Cited

U.S. PATENT DOCUMENTS

| | | | | |
|---|---|---|---|---|
| 6,264,292 B1 * | 7/2001 | Umeno et al. | ................. | 303/196 |
| 6,671,588 B2 * | 12/2003 | Otake et al. | ........................ | 701/3 |
| 2003/0200051 A1 * | 10/2003 | Nakashima et al. | .......... | 702/140 |
| 2007/0007088 A1 * | 1/2007 | Miller et al. | ............. | 188/1.11 L |
| 2007/0010928 A1 * | 1/2007 | Brusarosco et al. | ............ | 701/70 |
| 2009/0276113 A1 * | 11/2009 | Sugimoto | ....................... | 701/29 |

FOREIGN PATENT DOCUMENTS

| | | |
|---|---|---|
| EP | 1795902 | 6/2007 |
| JP | 2002340863 | 11/2002 |
| KR | 100680342 | 2/2007 |
| WO | 02/092364 | 11/2002 |

\* cited by examiner

*Primary Examiner* — Hussein A. Elchanti
(74) *Attorney, Agent, or Firm* — Kenyon & Kenyon LLP

(57) ABSTRACT

A method and a device for determining an acceleration peak, in particular for a tire, on the basis of a signal output by a sensor and assignable to the rotation of the tire, which signal corresponds to an acceleration, the determination being made by performing the following: recording at least one acceleration signal assignable to the rotation of the tire, the recording being carried out continuously; forming an average value from the recorded acceleration signal; comparing the recorded acceleration signal with the formed average value; forming a additional average value from the recorded acceleration signal; comparing the recorded acceleration signal with the formed average value; and determining the acceleration peak on the basis of the formed comparison.

17 Claims, 3 Drawing Sheets

METHOD AND DEVICE FOR DETECTING ACCELERATION PEAKS IN TIRES

RELATED APPLICATION INFORMATION

The present application claims priority to and the benefit of German patent application no. 10 2008 041 608.8, which was filed in Germany on Aug. 27, 2008, the disclosure of which is incorporated herein by reference.

FIELD OF THE INVENTION

The present invention relates to a method for detecting acceleration peaks in tires. Furthermore, the present invention relates to a device for executing a method for detecting acceleration peaks in tires.

BACKGROUND INFORMATION

With the increase in vehicles participating in public road traffic the demands on active and passive safety systems in vehicles have become greater as well. As a result, not only has the number of safety systems used in vehicles continued to increase over the past few years, but also their complexity. In addition to safety systems, more and more comfort systems, such as automatic level-controllers, adjustable chassis etc. are integrated in the vehicle if requested by the driver. These safety and comfort systems rely on data from a multitude of different sensors. Among the aforementioned safety and comfort systems are also so-called intelligent tires in which different variables are derived via the tire contact patch (tire contact area). For example, the condition of the road, the load state or the tire tread depth are able to be derived from the change in the tire contact patch.

Methods and devices, with whose aid it is possible to detect changes in the tire tread on the basis of an acceleration signal, the tire pressure and the temperature, are known from the related art.

From WO 02/092364, for example, a method is discussed by which the load state of a vehicle can be determined via the ratio of tire contact patch and tire circumference.

These methods all have in common that the characteristic accelerations or their peaks, which are output by a sensor installed inside the tire, are evaluated in order to measure geometric changes in the length of the tire contact patch or the tire tread. Typically, the radial acceleration signal, which is characterized by the centripetal acceleration in the round region of the tire, is analyzed, and executes a rotary motion and transitions into a translatory motion in the region of the tire contact area.

However, these methods have the disadvantage that the time signal of radial accelerations in the tire is no simple sinus or rectangular signal, but a rectangular signal that additionally exhibits an increase in the centripetal force in the entrance and exit areas of the tire contact area, and on which partially considerable vibrations caused by the road surface, the tire tread etc., for instance, are superposed.

SUMMARY OF THE INVENTION

The method according to the present invention having the features described herein advantageously provides a robust method for the reliable detection of the acceleration peaks that are characteristic for entering or exiting the tire contact area, in particular for a tire, on the basis of a signal that correspond to an acceleration, the signal being assignable to the rotation of the tire and output by at least one sensor.

The acceleration peak may be determined by recording at least one acceleration signal assignable to the rotation of the tire, the recording being carried out continually, in particular; forming an average value from the recorded acceleration signal; comparing the recorded acceleration signal to the formed average value; and/or determining the acceleration peak on the basis of the formed comparison.

According to the exemplary embodiments and/or exemplary methods of the present invention, an acceleration peak may be a brief acceleration peak or a brief acceleration peak value.

Advantageous embodiments and further developments of the present invention are made possible by the features further described and indicated herein.

In one exemplary embodiment, the acceleration peak is determined by forming an additional average value from the recorded acceleration signal; comparing the formed additional average value to a previously set threshold value; comparing the recorded acceleration signal to the formed average value; and/or determining the acceleration peak on the basis of the formed comparisons.

The average value and the additional average value may be determined by the same method. It is also possible to determine different average values using different methods. The average value and the additional average value may be determined at different times. The additional average value is able to be determined at a later time, in particular.

According to the exemplary embodiments and/or exemplary methods of the present invention, the start of the acceleration peak may be determined in that the recorded acceleration signal is greater than the average value, and the additional average value is greater than the preset threshold value. Furthermore, according to the exemplary embodiments and/or exemplary methods of the present invention, the end of the acceleration peak may be determined by a drop below the average value or by a drop below the additional average value. Moreover, a fault may be output if the additional average value is smaller than the average value.

By using a plurality of average values that differ from each other, and by analyzing the ratios of the average values with respect to each other, the robustness of the determination is able to be increased.

In one exemplary embodiment, a contact patch of a tire is determined by the beginning of the recorded acceleration peak and the end of the recorded acceleration peak.

According to the exemplary embodiments and/or exemplary methods of the present invention, the contact patch of the tire denotes the surface section of the tire surface that makes contact with the undersurface.

Another aspect of the exemplary embodiments and/or exemplary methods of the present invention relates to a device for determining an acceleration peak, in particular for a tire, on the basis of a signal that corresponds to an acceleration, the signal being assignable to the rotation of the tire and output by a sensor.

A still further aspect of the exemplary embodiments and/or exemplary methods of the present invention relates to a program for execution by a data processing system, the program executing the steps of the method of the present invention when run on a computer, a microcontroller or ASIC in the sensor and/or in a control device.

Furthermore, the exemplary embodiments and/or exemplary methods of the present invention relates to a data carrier, a program for implementing the method of the present invention being stored on the data carrier.

In the following, the exemplary embodiments and/or exemplary methods of the present invention is explained in greater detail by way of example with reference to the attached drawing.

DETAILED DESCRIPTION

Figure 1:
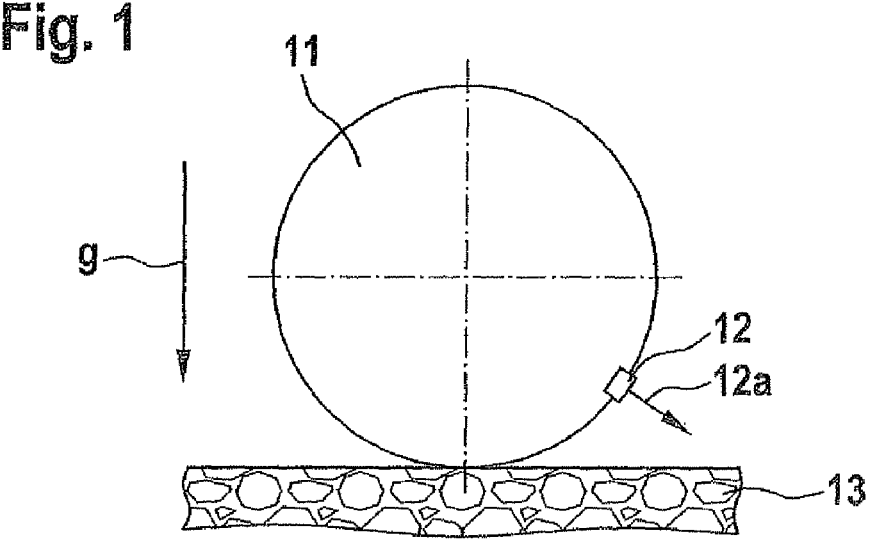
FIG. 1 shows a schematic illustration of a wheel having an acceleration sensor.

FIG. 1 schematically shows a wheel 11 of a vehicle (not shown), which is rolling on a surface 13. Affixed on wheel 11 is an acceleration sensor 12. The wheel may be made up of a wheel rim and a tire. The sensor is affixed on or inside the tire. The sensor may be a sensor module that also has a pressure sensor and/or a temperature sensor in addition to acceleration sensor 12. Acting on wheel 11 and acceleration sensor 12 is gravitational acceleration g. When wheel 11 rotates, a centripetal force 12a is acting on acceleration sensor 12 outside the contact patch of the tire, in the radial direction. This centripetal force 12a is proportional to the rate of rotation of wheel 11. In the region of the contact patch of the tire the rotary motion of sensor 12 transitions into a linear motion along surface 13, so that only gravitational acceleration g is acting on sensor 12.

Figure 2:
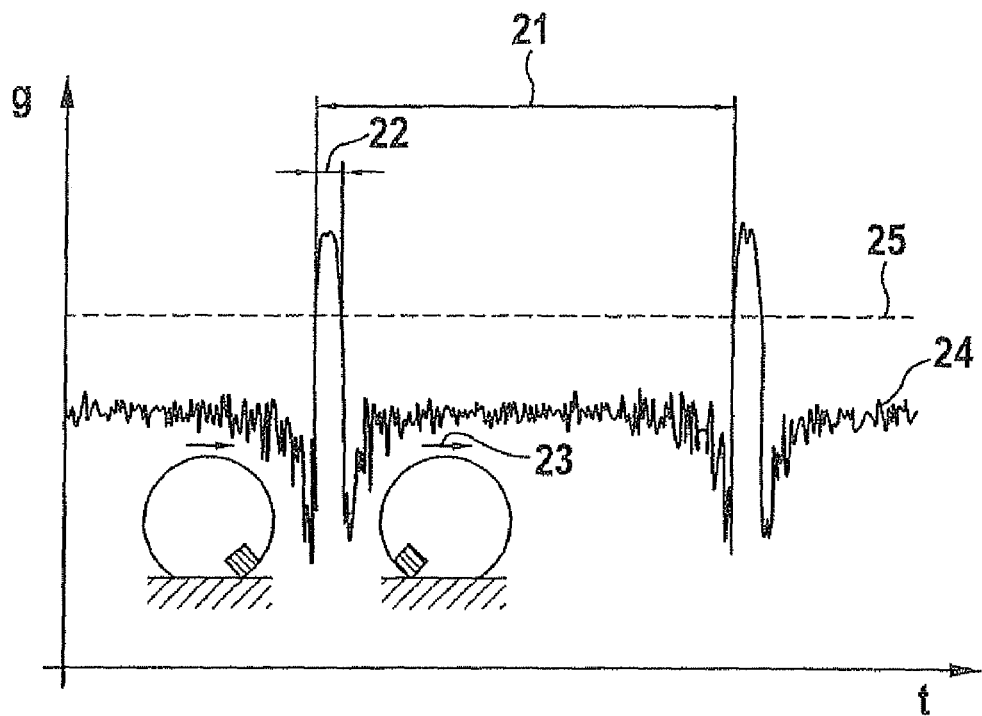
FIG. 2 shows a schematic illustration of recorded acceleration signals.

FIG. 2 shows the curve of the acceleration signal emitted by sensor 12. The illustrated acceleration signal is inverted with respect to the actual radial acceleration signal. The amplitude of the signal is proportional to the rate of rotation of wheel 11. The time is plotted on the abscissa of the diagram illustrated in FIG. 2. Plotted on the ordinate of the diagram shown in FIG. 2 is the acceleration, in multiples of gravitational acceleration g. The time duration of a wheel rotation is denoted by reference numeral 21. As already mentioned, the rotary motion of sensor 12 transitions into a linear motion along surface 13 in the region of the contact patch of the tire. This linear motion continues until sensor 12 has left the region of the contact patch of the tire again. During the linear motion, only the gravitational acceleration of approx. 1 g is acting on sensor 12. The length or the time duration during which the sensor is in linear motion is denoted by reference numeral 22. Reference numeral 23 denotes the direction of rotation of wheel 11. The curve of the acceleration signal emitted by sensor 12 is denoted by reference numeral 24. Reference numeral 25 denotes the average value of the acceleration signal emitted by sensor 12.

In one exemplary embodiment, a long-term average value adc_mean is formed in that a number of n measured values is added up and the sum is then divided by the number n. N is a whole natural number and lies within a range from 100-1000, which may be in a range from 200-875, and which may be in the range from 300-750, and even further, 500.

Instantaneous measured value adc is then compared to long-term average value adc_mean. If instantaneous measured value adc is smaller than long-term average value adc_mean, then the comparison is continued with the measured values recorded thereafter. This is repeated until the $(n+n)^{th}$ measured value, e.g., 500+500=1000. At the same time, the following measured values (n+1) to (n+n), e.g., 501 to 1000, are added up. Then, another long-term average value adc_mean is formed from the next n measured values (n+1) to (n+n), e.g., 501 to 1000, and may be compared to the previously determined long-term average value adc_mean for plausibilization purposes. After the $(n+n)^{th}$ measured value has been determined and compared, the sum of measured values (n+1) to (n+n), e.g., 501 to 1000, is divided by the number n of measured values, e.g., 500, and is used as new long-term average value adc_mean for comparison with the $(2n+1)^{th}$ measured value and the following measured values. As an alternative to this method, it is possible to determine a sliding average value.

Figure 3:
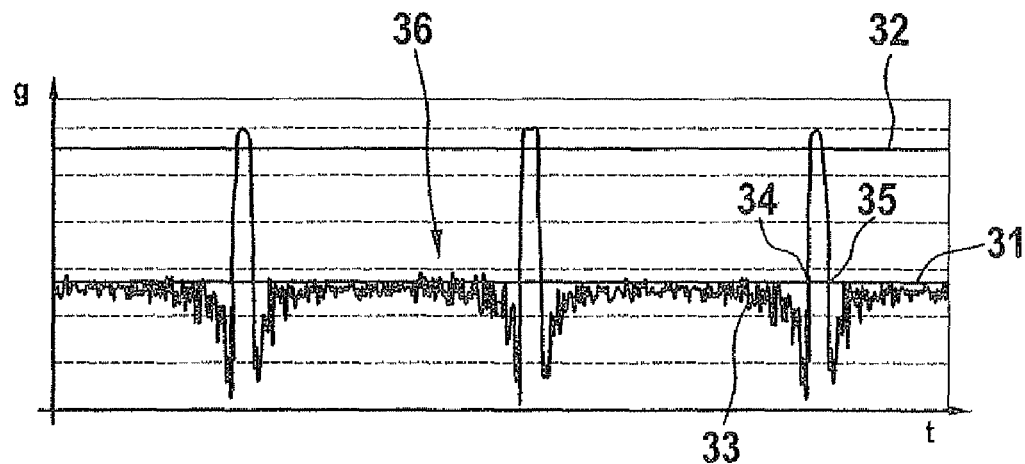
FIG. 3 shows an additional schematic illustration of recorded acceleration signals.

Similar to FIG. 2, FIG. 3 shows the curve of the acceleration signal emitted by sensor 12. The illustrated acceleration signal is inverted with respect to the actual radial acceleration signal. Reference numeral 31 denotes average value adc_mean, which is determined in the manner described above. A short-term average value adc_mean_short is determined when average value adc_mean has been exceeded, short-term average value adc_mean_short being formed using a lower number m of measured values. The following applies: m<n. M is a whole natural number, m lying in the range from 1-100, which may be in the range from 2-50, and which may be in the range from 3-15, and even more, 4.

If instantaneous measured value adc falls below average value adc_mean, then a faulty detection 36 exists, i.e., no acceleration peak is present. Rising flank 34 of the acceleration peak is considered left when a threshold value 32 has been exceeded. Since the acceleration in the contact patch lies at approx. 1 g, the threshold value should lie above it, e.g., at 5 g. If instantaneous measured value adc then drops below average value adc_mean again, then base point 35 of the second peak is detected. As an alternative to instantaneous measured value adc, it is also possible to use short-term average value adc_mean_short in order to increase the robustness.

Figure 4:
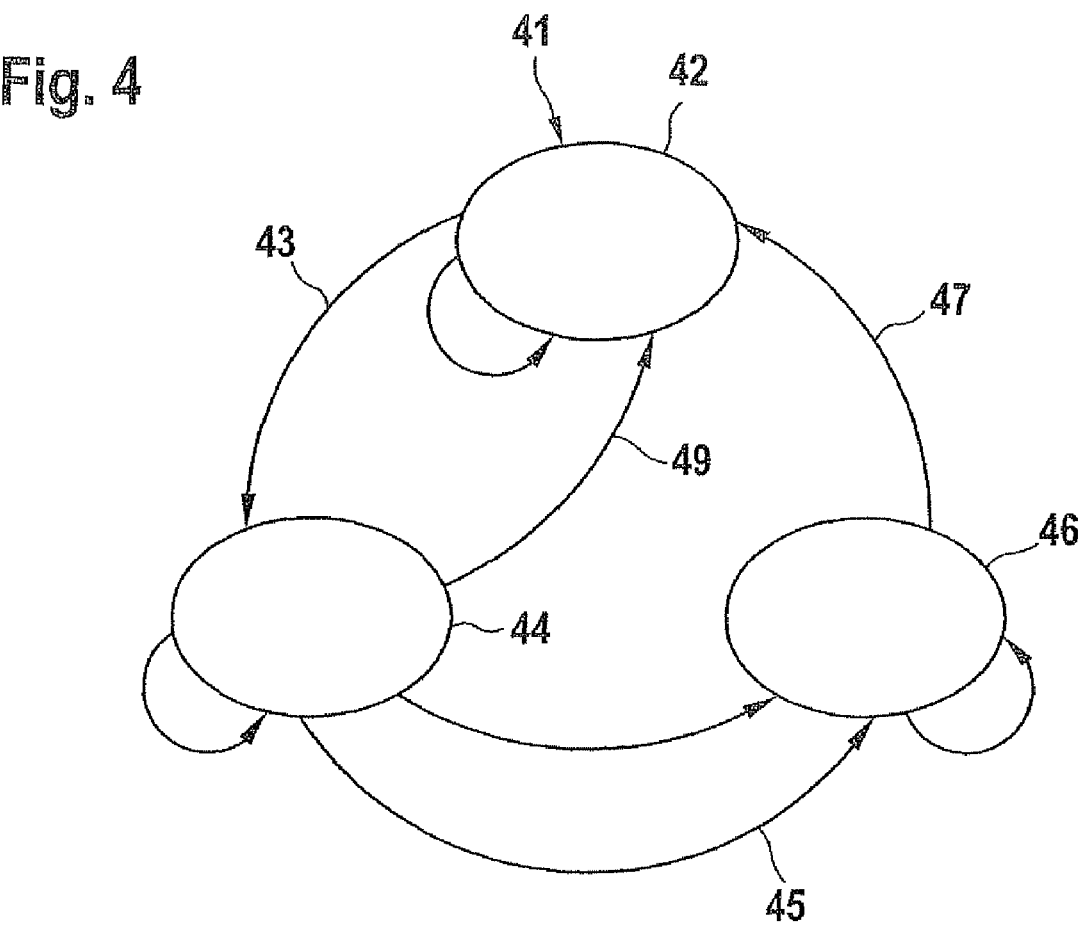
FIG. 4 shows a state diagram of the method according to the present invention.

FIG. 4 shows a state diagram of the method according to the present invention. Following the initialization of the method at 41, the method is in state 42, which indicates that the sensor is outside of the contact patch. As long as measured value adc is smaller than long-term average value adc_mean, the method remains in state 42. If measured value adc is greater than long-term average value adc_mean, sensor comes into the range of the contact patch, and the method transitions into state 44. In state 44 a rising flank is detected. As long as short-term average value adc_mean_short is smaller than threshold value flat_threshold, the method remains in state 44. If short-term average value adc_mean_short drops below long-term average value adc_mean, the method returns to state 42.

However, if short-term average value adc_mean_short is greater than threshold value flat_threshold, the contact patch determination is confirmed and the method transitions into state 46, i.e., the sensor is within the region of the contact patch. The method retains this state until measured value adc is greater than or equal to long-term average value adc_mean. If measured value adc falls below long-term average value adc_mean, the end of the contact patch is determined, and the method returns to initial state 42.

Figure 5:
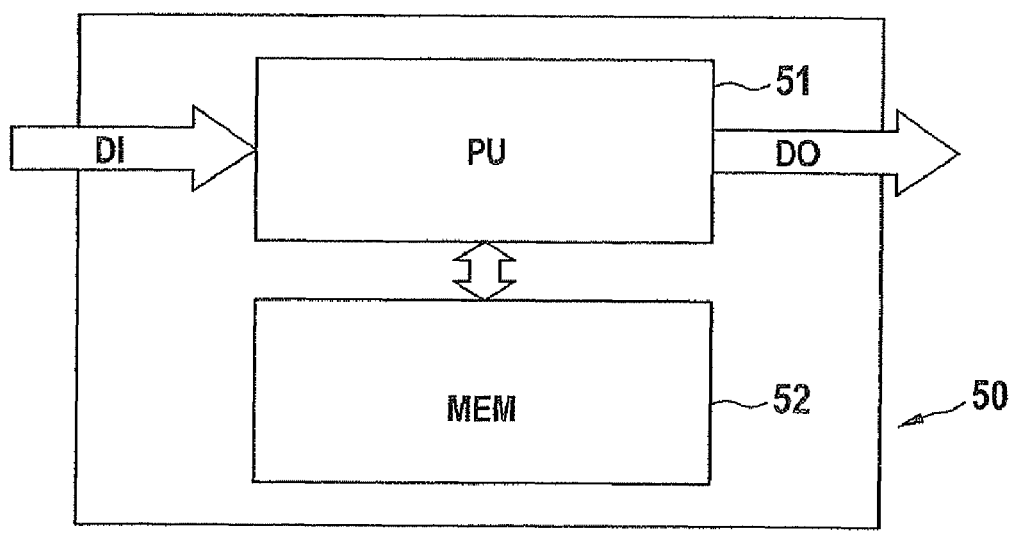
FIG. 5 shows a block diagram of a circuit configuration.

FIG. 5 shows a schematic block diagram of an alternative, software-based development of provided device 50 for detecting acceleration peaks in tires. The provided device includes a processing unit PU 51, which may be any processor or computer having a control unit, the control unit executing controls based on software routines of a program stored in a memory MEN 52. Program commands are fetched from memory 52 and loaded into the control unit of processing unit 51, in order to execute the processing steps of the functionalities that were described earlier with reference to FIGS. 2a-c. These processing steps may be implemented on the basis of input data DI and generate output date DO; the input data may correspond to at least one acceleration signal assignable to the rotation of the tire, and output data DO may correspond to a signal corresponding to the change in the contact patch of the tire.

A method and a device for determining acceleration peaks were described, in particular for a tire, on the basis of a signal output by a sensor and assignable to the rotation of the tire, which signal corresponds to an acceleration, the determination being carried out by at least the following steps: Recording at least one acceleration signal assignable to the rotation of the tire, the recording taking place continuously; forming an average value from the recorded acceleration signal; comparing the recorded acceleration signal to the formed average value; and/or determining the acceleration peak on the basis of the formed comparison.

It is pointed out that the proposed solutions according to the aforementioned specific developments are able to be implemented as software module(s) and/or hardware module(s) in the corresponding functional blocks. Furthermore, it is pointed out that the exemplary embodiments and/or exemplary methods of the present invention is not restricted to the abovementioned specific developments but can also be used for other sensor modules.

While exemplary developments were shown and described, it is clear from the preceding text that various modifications may be made without departing from the basic idea of the exemplary embodiments and/or exemplary methods of the present invention. Accordingly, the exemplary embodiments and/or exemplary methods of the present invention is not to be restricted to the exemplary embodiments by their detailed description.

What is claimed is:

1. A computer-implemented method for determining an acceleration peak, for a tire, based on a signal emitted by a sensor and assignable to a rotation of the tire, the signal corresponding to an acceleration, the method comprising:
    recording, by a processor, at least one acceleration signal assignable to the rotation of the tire, the recording taking place continuously;
    forming, by the processor, an average value from the recorded acceleration signal;
    comparing, by the processor, the recorded acceleration signal to the formed average value; and
    determining, by the processor, the acceleration peak based on the formed comparison, wherein the determining of the acceleration peak includes:
        forming an additional average value from the recorded acceleration signal;
        comparing the formed additional average value to a preset threshold value;
        comparing the recorded acceleration signal to the formed average value; and
        determining the acceleration peak based on the formed comparisons.

2. The method of claim 1, wherein the start of the acceleration peak is characterized in that the recorded acceleration signal is greater than the average value, and the additional average value is greater than the preset threshold value.

3. The method of claim 1, wherein the end of the acceleration peak is characterized by a drop below the average value.

4. The method of claim 1, wherein the end of the acceleration peak is characterized by a drop below the additional average value.

5. The method of claim 1, wherein a fault is output if the additional average value is smaller than the average value.

6. The method of claim 1, wherein a contact patch of a tire is defined by a beginning of the detected acceleration peak and an end of the detected acceleration peak.

7. The computer readable medium of claim 1 wherein the start of the acceleration peak is characterized in that the recorded acceleration signal is greater than the average value, and the additional average value is greater than the preset threshold value.

8. A device for determining an acceleration peak, for a tire, based on a signal emitted by a sensor and assignable to a rotation of the tire, which signal corresponds to an acceleration, comprising:
    a recording arrangement to continuously record at least one acceleration signal assignable to the rotation of the tire;
    a calculation arrangement to form an average value from the recorded acceleration signal; and
    an evaluation arrangement to receive signals from the recording unit and the calculation unit, and to determine the acceleration peak based on the received signals, wherein the evaluation arrangement includes:
        a first comparing arrangement to compare the recorded acceleration signal to the formed average value;
        a second comparing arrangement to compare the recorded acceleration signal to the formed additional average value; and
        a third comparing arrangement to compare the formed additional average value to a preset threshold value.

9. The device of claim 8, wherein the start of the acceleration peak is characterized in that the recorded acceleration signal is greater than the average value, and the additional average value is greater than the preset threshold value.

10. The device of claim 8, wherein the end of the acceleration peak is characterized by a drop below the average value.

11. The device of claim 8, wherein the end of the acceleration peak is characterized by a drop below the additional average value.

12. The device of claim 8, wherein a fault is output if the additional average value is smaller than the average value, and wherein a contact patch of a tire is defined by a beginning of the detected acceleration peak and an end of the detected acceleration peak.

13. A non-transitory computer readable medium having a computer program, which is executable by a computer processor, comprising:
    a program code arrangement having program code for determining an acceleration peak, for a tire, based on a signal emitted by a sensor and assignable to a rotation of the tire, the signal corresponding to an acceleration, by performing the following:
        recording at least one acceleration signal assignable to the rotation of the tire, the recording taking place continuously;
        forming an average value from the recorded acceleration signal;
        comparing the recorded acceleration signal to the formed average value; and
        determining the acceleration peak based on the formed comparison, wherein the determining of the acceleration peak includes:
- forming an additional average value from the recorded acceleration signal;
- comparing the formed additional average value to a preset threshold value;
- comparing the recorded acceleration signal to the formed average value; and
- determining the acceleration peak based on the formed comparisons.

14. The computer readable medium of claim 13, wherein the end of the acceleration peak is characterized by a drop below the average value.

15. The computer readable medium of claim 13, wherein the end of the acceleration peak is characterized by a drop below the additional average value.

16. The computer readable medium of claim 13, wherein a fault is output if the additional average value is smaller than the average value.

17. The computer readable medium of claim 13, wherein a contact patch of a tire is defined by a beginning of the detected acceleration peak and an end of the detected acceleration peak.

* * * * *